United States Patent
Kotzur et al.

(10) Patent No.: US 8,539,116 B2
(45) Date of Patent: **\*Sep. 17, 2013**

(54) SYSTEM AND METHOD FOR DYNAMICALLY CONFIGURING A TARGET DEVICE

(71) Applicants: Gary B. Kotzur, Austin, TX (US); Chandrashekar Nelogal, Round Rock, TX (US); John R. Sieber, Cedar Park, TX (US); Kevin T. Marks, Georgetown, TX (US)

(72) Inventors: Gary B. Kotzur, Austin, TX (US); Chandrashekar Nelogal, Round Rock, TX (US); John R. Sieber, Cedar Park, TX (US); Kevin T. Marks, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,531

(22) Filed: Nov. 5, 2012

(65) Prior Publication Data

US 2013/0060968 A1 Mar. 7, 2013

Related U.S. Application Data

(63) Continuation of application No. 12/890,062, filed on Sep. 24, 2010, now Pat. No. 8,312,177.

(51) Int. Cl.
*G06F 3/00* (2006.01)

(52) U.S. Cl.
USPC ............................................................ 710/8

(58) Field of Classification Search
USPC ............................................................ 710/8
See application file for complete search history.

(56) References Cited

U.S. PATENT DOCUMENTS

| 5,235,689 | A | 8/1993 | Baker et al. | 395/425 |
|---|---|---|---|---|
| 7,058,749 | B2 | 6/2006 | Loffink | 710/313 |
| 7,290,066 | B2 | 10/2007 | Voorhees et al. | 710/5 |
| 7,624,206 | B2 | 11/2009 | Bailey et al. | 710/51 |
| 7,676,613 | B2 | 3/2010 | Bashford et al. | 710/74 |
| 7,769,831 | B2 | 8/2010 | Johnson | 709/220 |
| 2010/0250785 | A1 | 9/2010 | Shin et al. | 710/3 |

*Primary Examiner* — Chun-Kuan Lee
(74) *Attorney, Agent, or Firm* — Baker Botts L.L.P.

(57) ABSTRACT

In accordance with the present disclosure, a method for dynamically configuring a target device comprises receiving by one or more ports of a target device one or more initiator identifiers from one or more initiators. The method further comprises determining whether a plurality of ports received initiator identifiers from a common initiator. The method further comprises configuring the plurality of the ports to operate as a single, logical port if the plurality of ports received initiator identifiers from a common initiator.

20 Claims, 4 Drawing Sheets

SYSTEM AND METHOD FOR DYNAMICALLY CONFIGURING A TARGET DEVICE

RELATED APPLICATION

This application is a continuation of pending U.S. patent application Ser. No. 12/890,062 filed Sep. 24, 2010, the contents of which is incorporated herein in its entirety by this reference.

TECHNICAL FIELD

The present disclosure relates generally to information handling systems and specifically to a system and method for dynamically configuring a target device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use storage resources to store data. Storage resources may store data on one or more logical storage units, also known simply as "logical units." Each logical unit may be made up of one or more hard disk drives, magnetic tape libraries, optical disk drives, magneto-optical disk drives, compact disk drives, compact disk arrays, disk array controllers, and/or any other type of computer-readable media. The storage resources may be included in Serial Attached Small Computer System Interface (Serial Attached SCSI or (SAS)) component target devices that are communicatively coupled to one or more initiating devices. The initiating devices may send information to or request information from the target devices. As the rate at which the target devices may retrieve and store data increases, the rate of information transfer between target and initiating devices may need to be increased to fully take advantage of the rapid storage and retrieval rates.

SUMMARY

In accordance with the present disclosure, a method for dynamically configuring a target device comprises receiving by one or more ports of a target device one or more initiator identifiers from one or more initiators. The method further comprises determining whether a plurality of ports received initiator identifiers from a common initiator. The method further comprises configuring the plurality of the ports to operate as a single, logical port if the plurality of ports received initiator identifiers from a common initiator.

In accordance with another embodiment of the present disclosure an information handling system configured to dynamically configure a target device comprises one or more ports communicatively coupled to one or more initiators. The ports are configured to receive initiator identifiers from the one or more initiators. The system further comprises a control unit communicatively coupled to the one or more ports. The control unit is configured to determine whether a plurality of ports have received initiator identifiers from a common initiator. The control unit is further configured to configure the plurality of ports to operate as a single, logical port if the plurality of ports each received an initiator identifier from a common initiator.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may logically appear to an operating system as a single logical unit.

Figure 1:
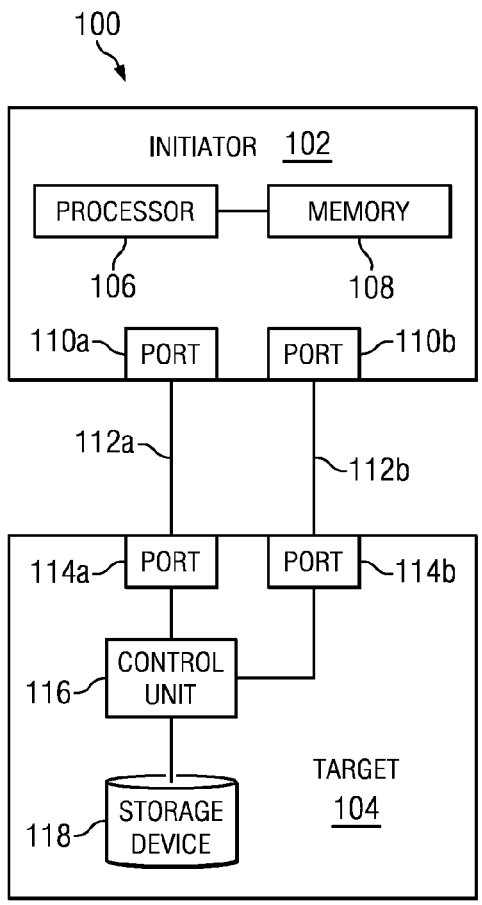
FIG. 1 illustrates an example system for dynamically configuring a Serial Attached Small Computer System Interface (Serial Attached SCSI or (SAS)) target device.

FIG. 1 illustrates an example system 100 for dynamically configuring a Serial Attached Small Computer System Interface (Serial Attached SCSI or (SAS)) target device. System 100 may include one or more initiators 102, one or more targets 104, and one or more communication media 112. In the present example, one initiator 102 and one target 104 are depicted, but the present disclosure should not be limited to such. Initiator 102 may include one or more processors 106, one or more memories 108 and one or more physical ports 110. Target 104 may include one or more physical ports 114, one or more control units 116 and one or more storage devices 118.

Initiator 102 may be communicatively coupled to target 104 via ports 110 and 114, and via communication media 112. Although system 100 depicts a direct connection between initiator 102 and target 104 via communication media 112, the present disclosure should not be limited to such. Initiator 102 and target 104 may be connected via a network that includes none, one or more nodes between initiator 102 and target 104. Accordingly, communication media 112 may comprise any suitable communication media that may be included in a network, such as wires, optical fibers, microwaves, radio waves, and other electromagnetic and/or optical carriers; and/or any combination of the foregoing.

Initiator 102 may be an information handling system configured to initiate a SCSI session between initiator 102 and one or more targets 104. SCSI is a set of standards for physically connecting and transferring data between information handling systems. The SCSI standards define commands, protocols, and electrical and optical interfaces. Initiator 102 may initiate a SCSI session with target 104 by sending a SCSI command to target 104. For example, one type of SCSI command may comprise a command to retrieve data from, or send data to target 104.

Initiator 102 may include a processor 106 configured to perform the operations of initiator 102, such as initiate SCSI sessions with target 104. Processor 106 may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/ or process data. In some embodiments, processor 106 may interpret and/or execute program instructions and/or process data stored in an associated memory 108 and/or another component of an associated initiator 102.

Memory 108 may be communicatively coupled to its associated processor 106 and may comprise any system, device or apparatus operable to retain program instructions or data for a period of time (e.g., computer-readable media). In the present disclosure, memory 108 may include instructions for initiating and creating a SCSI session that may be read and executed by processor 106. Memory 108 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its initiator 102 is turned off.

Initiator 102 may also include one or more physical ports 110. Although the present disclosure depicts initiator 102 including two ports 110, initiator 102 may include more or fewer ports 110. Ports 110 may be communicatively coupled to processor 106 and/or memory 108 and may be configured to interface initiator 102 with transmission media for communicating with other devices such as target 104. Examples of ports 110 may comprise wireless transmitters/receivers, optical transmitters/receivers, Ethernet ports, etc. Ports 110 may sometimes be referred to as "Phys." Multiple physical ports 110 may be grouped together and act as a single logical port. Target 104 may also include physical ports 114, which may be similar or identical to physical ports 110. As mentioned above, initiator 102 and target 104 may be communicatively coupled to each other via ports 110 and 114, and transmission media 112.

Target 104 may comprise any system, apparatus, or device configured to store data. Target 104 may include one or more storage devices 118 configured to store data. Storage devices 118 may comprise logical storage units ("LUNs") which may comprise one or more hard disk drives, magnetic tape libraries, optical disk drives, magneto-optical disk drives, compact disk drives, compact disk arrays, disk array controllers, solid state storage devices ("SSS devices" or "SSDs") that comprise flash memory, and/or any other type of computer-readable media. Storage device 118 may also be configured to retrieve data to be used by target 104 or initiator 102. Storage device 118 may also store data received by target 104 from initiator 102.

Target 104 may include physical ports 114 similar to physical ports 110. Target 104 may be configured to receive SCSI commands from initiator 102 at ports 114 and to perform functions according to those commands. For example, target 104 may receive a SCSI data retrieval request from initiator 102 and target 104 may retrieve that data from storage device 118 to be sent to initiator 102. In another example, target 104 may receive a data storage command from initiator 102, wherein initiator 102 directs target 104 to store data on storage device 118.

In traditional embodiments, the ports of a target device may be configured to operate either in "wide mode" or "narrow mode" before being coupled to an initiator. In such embodiments, the ports of the target device may not change from either "narrow mode" or "wide mode" once they have been set to that particular mode.

Operating in "narrow mode" may generally refer to each physical port of a target device acting as a separate independent port or interface between a target and initiator. While operating in narrow mode, the bandwidth, or rate of data transmission, between a target and initiator, may be limited to the bandwidth of each individual port.

Operating in "wide mode" may refer to a plurality of ports grouped together to act as a single logical port. While operating in wide mode, the bandwidth of the logical port may be the aggregate of the bandwidth of each individual port. Consequently, the data transmission rate of the ports operating in "wide mode" to act as a single logical port may be higher than a single port acting as one, individual port, in "narrow mode."

As the rate of data storage/retrieval of storage devices included in targets 104 increases, the need to operate in "wide mode" increases. By operating in "wide mode" devices (e.g., initiators 102 and targets 104) may take advantage of the high speed storage device capabilities because the bandwidth of a single port may not be capable of supporting the data storage and retrieval speeds of these high speed storage devices.

Unlike traditional embodiments, physical ports 114 of target 104 may be dynamically configured to operate in "narrow mode" or "wide mode" upon connection to one or more initiators 102. Therefore, target 104 may be configured to determine if its physical ports 114 should operate in narrow mode or wide mode, depending on the application, and may configure itself accordingly.

Target 104 may include control unit 116 configured to determine whether ports 114 of target 104 should operate in "narrow mode" or "wide mode." Control unit 116 may include a processor and memory, similar to processor 106 and memory 108 included in initiator 102, to store and perform the operations of control unit 116. Additionally, although target 104 is depicted as including only one control unit 116, the present disclosure should not be limited to such. For example, a different control unit 116 may correspond with each port 114, to perform and control the operations with respect to that individual port 114.

Control unit 116 may determine whether ports 114a and 114b of target 104 should operate in narrow or wide mode according to whether the same initiator 102 is coupled to more than one port 114. In the present example, initiator 102 is coupled to target 104 via port 110a, transmission media 112a and port 114a. Initiator 102 is also coupled to target 104 via port 110b, transmission media 110b, and port 114b. Accordingly, a single initiator (initiator 102) is coupled to more than one port 114 (ports 114a and 114b) of target 104 in the present example. Thus, control unit 116 may determine that ports 114a and 114b of target 104 should operate in wide mode, such that physical ports 114a and 114b are considered as one logical port, with respect to initiator 102.

Control unit 116 may determine that initiator 102 is coupled to both ports 114a and 114b upon initialization and booting of target 104 after target 104 has been coupled to initiator 102. When target 104 is powered on, ports 114a and 114b may receive an initialization request from initiator 102 to synchronize ports 110a and 110b with ports 114a and 114b respectively. Initiator 102 may send an initiator identifier in each initialization request that identifies initiator 102 as the initiator sending the request. Control unit 116 may compare the initiator identifier received at port 114a with the initiator identifier received at port 114b. Because both initiator identifiers originated from initiator 102, the two initiator identifiers may be the same. Accordingly, control unit 116 may determine that both ports 114a and 114b are coupled to initiator 102, and that ports 114a and 114b should operate in wide mode.

Upon determining that ports 114a and 114b should operate in wide mode, control unit 116 may configure ports 114a and 114b accordingly. Upon receiving an initialization request from initiator 102 at port 114a, control unit 116 may send a port identifier to initiator 102 identifying port 114a via port 114a, transmission medium 112a and port 110a. After determining that target 104 should operate in wide mode, control unit 116 may also send the port identifier associated with port 114a to initiator 102 via port 114b, transmission medium 112b and port 110b. Accordingly, initiator 102 may "see" both ports 114a and 114b as one logical port having a single port identifier.

In alternative embodiments, the port identifier associated with port 114b may be used instead of the identifier associated with port 114a. It may be irrelevant which identifier is used as long as a single identifier is sent to initiator 102 for every port 114 coupled to the same initiator 102. Additionally, although target 104 is depicted as being coupled to initiator 102 via two ports 112, the present disclosure should not be limited to such.

In some embodiments, control unit 116 may delay the initialization of port 114b until port 114a has been initialized, or vice versa. For example, both ports 114a and 114b may receive initialization requests from initiator 102, but port 114b may not begin configuration until after port 114a has been configured. Control unit 116 may indicate that port 114a has been configured by setting a bit indicating so. With that bit set, control unit 116 may be configured to begin configuration of port 114b. Once port 114a has been configured, control unit 116 may begin configuration of port 114b by first comparing the initiator identifiers received by ports 114a and 114b. Thus, control unit 116 may determine whether ports 114a and 114b are coupled to the same initiator.

In other embodiments, ports 114a and 114b may each include control units that may control configuration of their respective ports. In such embodiments, the control unit associated with port 114a may be configured to set the bit indicating that port 114a has been configured, and the control unit associated with port 114b may be configured to read the bit to determine whether or not to begin configuration of port 114b.

In yet other embodiments, control unit 116 may set a bit indicating that port 114a has received an initialization request even before port 114a is completely configured, and control unit 116 may compare the initiator identifiers received at port 114a and 114b upon that bit being set. Accordingly, control unit 116 may also begin configuration of port 114b upon that bit being set, once port 114b has received an initialization request.

It may be advantageous to wait for port 114a to be configured or to wait until port 114a receives a initialization request before configuring port 114b because initiator 102 may send the initialization requests at different times. Accordingly, if port 114b were to receive an initialization request before port 114a, waiting to configure port 114b before configuring port 114a may prevent control unit 116 from attempting to compare the initiator identifier received at port 114b with an initiator identifier received at port 114a before port 114a even receives an initiator identifier. Thus, control unit 116 may be prevented from falsely determining that ports 114a and 114b are not both coupled to the same initiator 102 solely because port 114a has not yet received an identifier for comparison.

Although, the present example depicts port 114b waiting until port 114a is configured, port 114a may wait until port 114b is configured instead of port 114b waiting until port 114a is configured without departing from the scope of the disclosure. In embodiments that may include more than two ports 114, any appropriate prioritizing scheme may be utilized to determine the order in which ports 114 may be configured.

Modifications, additions or omissions may be made to system 100 without departing from the scope of the disclosure. For example, system 100 may include more initiators 102 and more targets 104 than those depicted. Additionally, initiator 102 and target 104 may include more ports than the number depicted, and also may include other components that perform some, more or none of the operations described.

Figure 2:
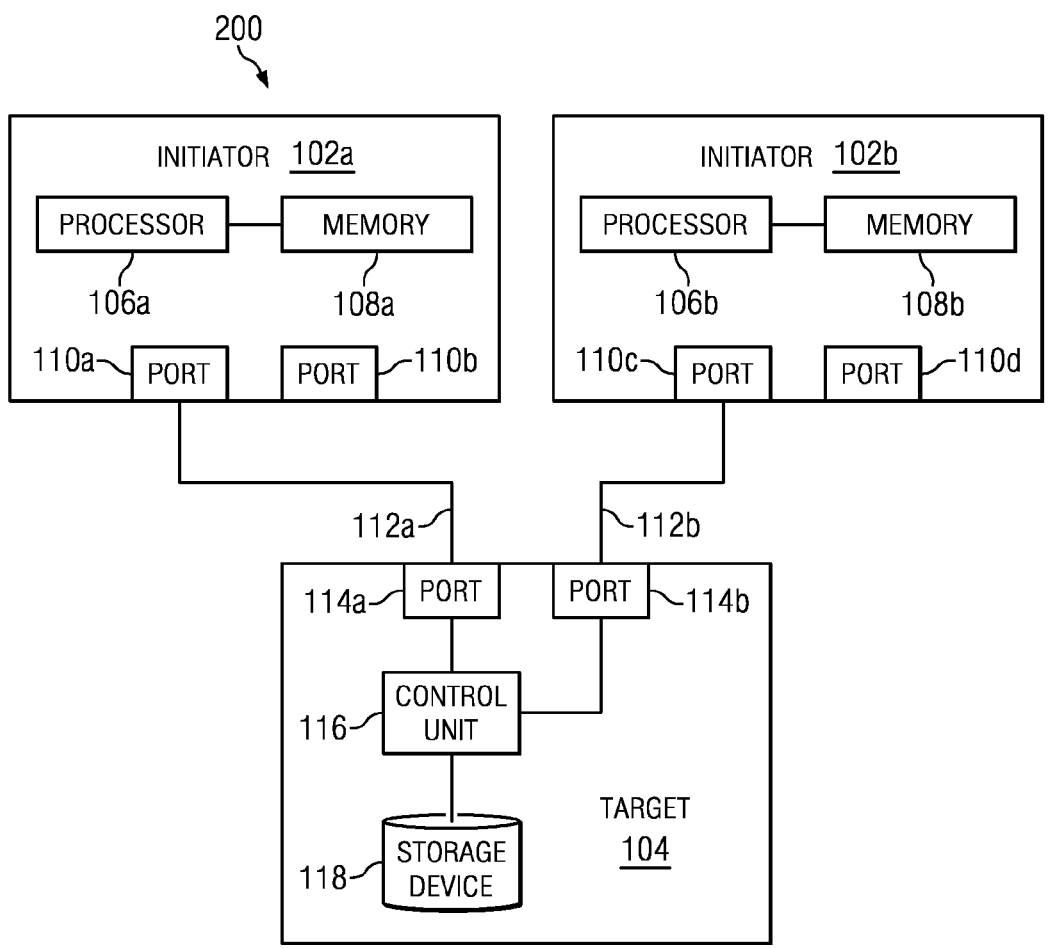
FIG. 2 illustrates another example system for dynamically configuring a SAS target device.

FIG. 2 illustrates another example system 200 for dynamically configuring a SAS target device. System 200 is similar to system 100 except it depicts two initiators 102 coupled to target 104. In system 200, initiator 102a is coupled to target 104 via port 110a, transmission medium 112a and port 114a. Additionally, initiator 102b is also coupled to target 104 via port 110c, transmission medium 112b, and port 114b.

Upon powering up, target 104 may receive an initialization request from initiator 102a via port 114a and an initialization request from initiator 102b via port 114b. The initialization request from initiator 102a may include an initiator identifier associated with initiator 102a, and the initialization request from initiator 102b may include a different initiation identifier associated with initiator 102b.

Once the initialization request is received at port 114a, control unit 116 may begin configuration of port 114a. Once the initialization request is received at port 114b, control unit 116 may wait until port 114a has received its initialization request or has finished configuration similar to that described with respect to FIG. 1.

Upon configuration of port 114a, control unit 116 may compare the initiator identifier received at port 114a with the initiator identifier received at port 114b. Because the initiator identifiers are from different initiators 102, the initiator identifiers may be different. Accordingly, control unit 116 may determine that port 114a is coupled to a different initiator than port 114b, and that ports 114a and 114b of target 104 should operate in narrow mode.

Control unit 116 may configure ports 114a and 114b of target 104 to operate in narrow mode. In the present example, control unit 116 may have already sent initiator 102a a port identifier associated with port 114a, via port 114a, just as described with respect to FIG. 1 when target 104 was configured to operate in wide mode. Accordingly, port 114a may be configured such that the port identifier associated with port 114a may be sent to the initiator coupled to port 114a regardless of whether port 114a is operating in narrow or wide mode. Thus, the configuration of port 114a in either narrow or wide mode may be similar or identical.

However, unlike in wide mode of port 114b where control unit 116 may send a port identifier associated with port 114a via port 114b to make it logically appear that ports 114a and 114b are the same port, in narrow mode, control unit 116 may send a port identifier associated with port 114b via port 114b to initiator 102b. Accordingly both ports 114a and 114b may act as logically separate, independent ports due to ports 114a and 114b being coupled to initiators 102a and 102b respectively.

Modifications, additions, or omissions may be made to system 200 without departing from the scope of the disclosure. For example, although port 114a is depicted as being configured first, port 114b may be configured before port 114a in other embodiments. Additionally, the number of ports shown is for illustrative purposes, and the present disclosure should not be limited to such.

Figure 3:
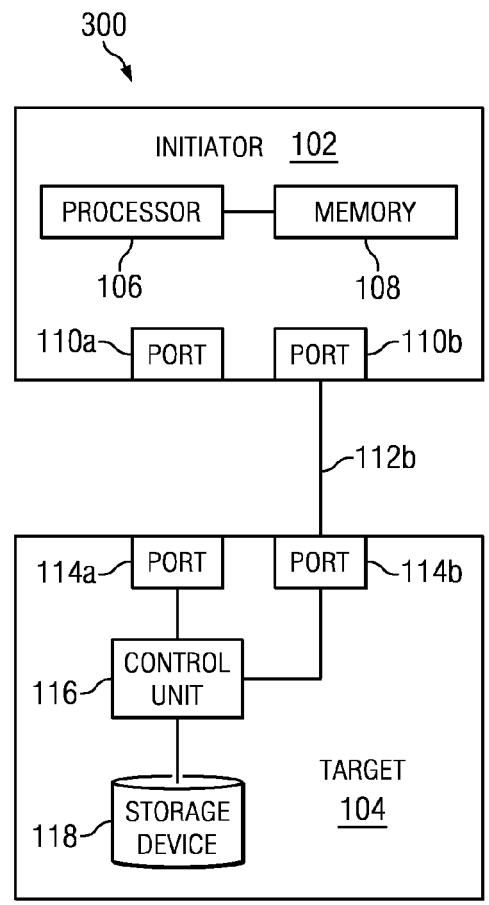
FIG. 3 illustrates another example system for dynamically configuring a SAS target device.

FIG. 3 illustrates another example system 300 for dynamically configuring a SAS target device. System 300 is substantially similar to system 100 except that initiator 102 is depicted as only being coupled to target 104 via port 110b, transmission medium 112b and port 114b. In this particular example, upon receiving an initialization request at port 114b, control unit 116 may set a timer for port 114b. While the timer is running, control unit 116 may continue to check to see if the flag or bit is set that indicates that port 114a is configured. If the bit is set before the timer expires—which may occur in instances where port 114a is coupled to an initiator, such as described with respect to FIGS. 1 and 2—control unit 116 may proceed with the configuration of port 114b in either wide or narrow mode similar to that described with respect to FIGS. 1 and 2.

However, if the timer expires before port 114a is configured, control unit 116 may determine that port 114a is not coupled to initiator 102, and may configure port 114b to operate in narrow mode by sending the port identifier associated with port 114b to initiator 102. Accordingly, if only port 114b is coupled to initiator 102, such as shown in system 300, control unit 116 may configure port 114b without port 114a being configured. Otherwise, in a situation such as that depicted in FIG. 3, if control unit 116 were to wait for port 114a to be configured before configuring port 114b, port 114b may never be configured.

Additionally, although the description with respect to FIGS. 1 and 2 describes control unit 116 waiting to configure port 114a until port 114b is configured, the timer may be used with respect to systems 100 and 200 also. With respect to systems 100 and 200, the timer may also allow for configuration of port 114b after expiration of the timer to prevent indefinitely waiting to configure port 114b if port 114a is experiencing some sort of failure or problem that is preventing port 114a from being configured.

The timer may be set to correspond with the delay time for configuration of a port based on the SAS standard. The timer may also be set to account for time discrepancies between receipt of initialization requests at different ports. Once this delay has passed control unit 116 may reasonably ascertain that port 114a is not coupled to an initiator 102, or is experiencing a failure or problem.

Modifications, additions or omissions may be made to system 300 without departing from the scope of the disclosure. For example, although the timer is described as being associated with the SCSI delay time, the present disclosure is not limited to such. Additionally, although the timer has been described with respect to port 114b, the timer may be associated with port 114a instead of port 114b if port 114b is to be configured first. The labeling of specific ports is for descriptive purposes only.

Figure 4:
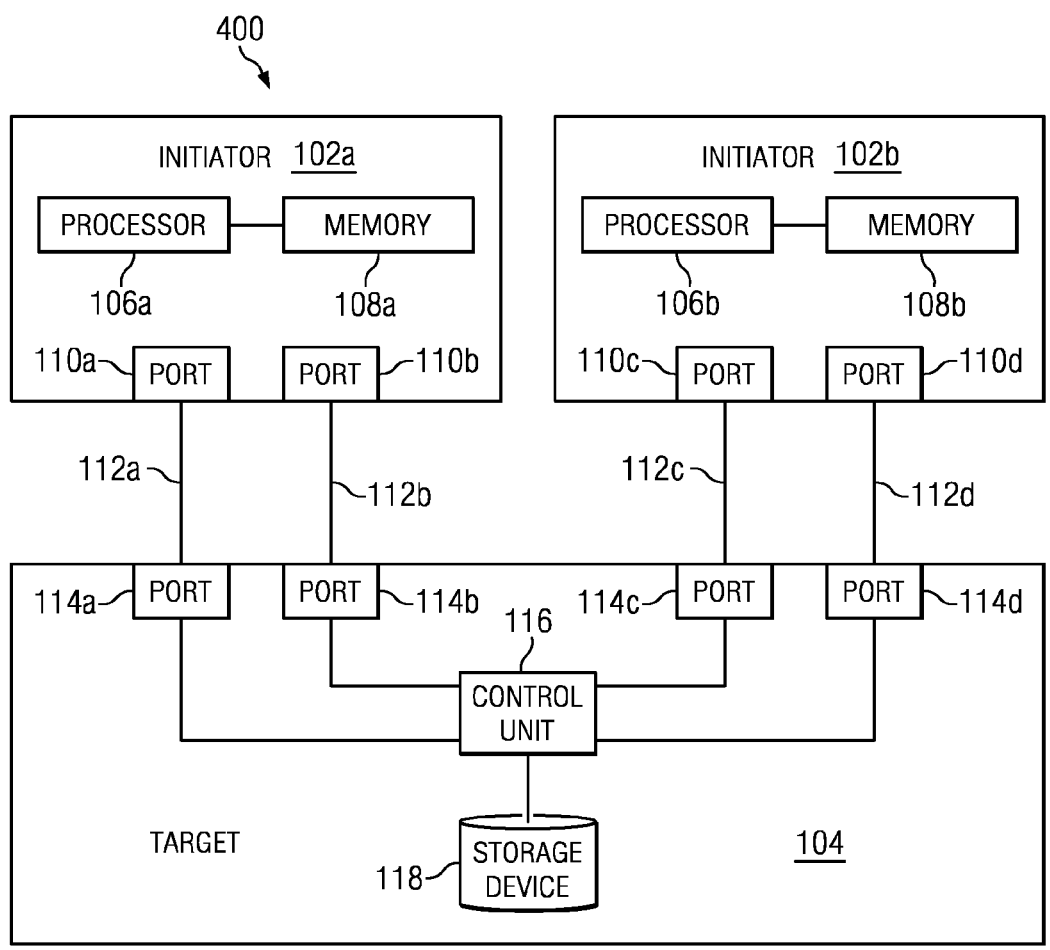
FIG. 4 illustrates another example system for dynamically configuring a SAS target device.

FIG. 4 illustrates an example system 400 also configured to dynamically configure a SAS target device. System 400 is similar to systems 100-300 depicted in FIGS. 1-3, but depicts two initiators 102, initiators 102a and 102b, and target 104 is depicted as including four ports 114, ports 114a, 114b, 114c and 114d.

Ports 114 may be prioritized according to a prioritization scheme. For example port 114a may have the highest priority, port 114b may have second priority, port 114c may have third priority and port 114d may have fourth and last priority.

Control unit 116 may determine if any of the ports 114 are coupled to the same initiator 102. For any group of ports coupled to the same initiator, control unit 116 may configure the ports to logically appear to the shared initiator as a single port. Control unit 116 may configure the ports 114 that are coupled to the same initiator 102 to logically appear as a single port by sending the same port identifier through all the ports coupled to the shared initiator. In some instances, the same port identifier may be associated with the highest prioritized port coupled to the shared initiator, as described below.

In the present example, port 114a may receive an initialization request from initiator 102a via port 110a and transmission medium 112a. Port 114b may also receive an initialization request from initiator 102a via port 110b and transmission medium 112b. Both initialization requests from initiator 102a may include identical initiator identifiers because both requests originated from initiator 102a. Additionally, ports 114c and 114d may each respectively receive initialization requests from initiator 102b via ports 110c and 110d, and transmission media 112c and 112d. The initialization requests received from initiator 102b may each also include identical initiator identifiers that identify initiator 102b.

Control unit 116 may sequentially configure port 114a first, port 114b second, port 114c third and port 114d fourth and last according to the prioritization scheme. For example, upon receipt of an initialization request at port 114a, control unit 116 may begin configuration of port 114a, which may include sending a port identifier associated with port 114a through port 114a to initiator 102a. Due to port 114a having the highest priority, in the present example, regardless of whether port 114a is coupled to the same initiator as another port 114, control unit 116 may send a port identifier associated with port 114a through port 114a to the initiator coupled to port 114a.

Upon receipt of an initialization request at port 114b, control unit 116 may delay configuration of port 114b until port 114a has been configured. Upon receipt of an initialization request at port 114c, control unit 116 may delay configuration of port 114c until both ports 114a and 114b have been configured, and upon receipt of an initialization request at port 114d, control unit 116 may delay configuration of port 114d until ports 114a, 114b and 114c have all been configured.

After port 114a has been configured, because ports 114a and 114b are coupled to the same initiator in the present example, control unit 116 may configure port 114b to operate in wide mode with respect to port 114a, similar to that described with respect to FIG. 1. In alternative embodiments where ports 114a and 114b are not coupled to the same initiator 102, control unit 116 may configure port 114b similar to that described with respect to FIG. 2. In yet other embodiments, port 114b may be associated with a delay timer to contemplate situations when port 114a is not coupled to an initiator or is disabled. In situations where port 114a is disabled or not coupled to an initiator, control unit 116 may configure port 114b similar to that described with respect to FIG. 3.

Even though the descriptions of FIGS. 1-3 specifically relate to systems with targets 104 that have only two ports, while system 400 in FIG. 4 relates to a target 104 that has four ports, the configuration of port 114b may be the same with respect to FIG. 4 because port 114b may be the second prioritized port. Due to the prioritization in the present example, configuration of port 114b may depend only on whether port 114b is coupled to the same initiator 102 as port 114a. If ports 114b and 114a are coupled to the same initiator 102, port 114a's port identifier may be sent through port 114b such that ports 114a and 114b logically appear and act as a single port with respect to the shared initiator 102. However, if ports 114b and 114a are not coupled to the same initiator 102, with port 114b being second priority, the port identifier associated with port 114b may be sent through port 114b, regardless of whether the lower priority ports are coupled to the same initiator as port 114b. Therefore, in the present example, port 114b's configuration may depend only on whether or not it is connected the same initiator 102 as port 114a (e.g., operating in wide mode with port 114a), regardless of whether or not port 114b is operating in narrow or wide mode with respect to the other ports 114.

Returning to FIG. 4, after ports 114a and 114b have been configured, control unit 116 may begin configuration of port 114c. In configuration of port 114c, control unit 116 may first compare the initiator identifier received at port 114c with the initiator identifier received at port 114a. In the present example, the initiator identifiers may not be equal, because the initialization request received at port 114a originated from initiator 102a, whereas the initialization request received at port 114c originated from initiator 102b. Therefore, control unit 116 may determine that ports 114a and 114c are not coupled to the same initiator and may then determine whether ports 114b and 114c are coupled to the same initiator.

Control unit 116 may compare the initiator identifiers received at ports 114b and 114c and may determine that ports 114b and 114c also are not coupled to the same initiator. Accordingly, after determining that port 114c is not coupled to the same initiator as any of the ports with higher priority than port 114c (e.g., ports 114a and 114b), control unit 116 may send a port identifier associated with port 114c through port 114c to initiator 102b during configuration of port 114c. As described with respect to ports 114a and 114b, in the present example due to the prioritization, configuration of port 114c may only depend on whether it is coupled to the same initiator as any of the ports 114 that have higher priority (e.g., ports 114a and 114b), but not those that have lower priority (e.g., port 114d).

In another embodiment, ports 114a and 114c may be coupled to the same initiator. In such an embodiment, due to port 114a having highest priority, control unit 116 may configure port 114c by sending a port identifier associated with port 114a through port 114c. Control unit 116 may forgo checking whether or not ports 114c and 114b are coupled to the same initiator because, due to the prioritization scheme, even if port 114b is coupled to the same initiator as port 114c (and thus also coupled to the same initiator as port 114a) control unit 116 may send the port identifier associated with port 114a through each of ports 114a, 114b, and 114c to the initiator coupled to all the ports, such that the initiator 102 "sees" the three ports as one single logical port. In such a scenario where ports 114a and 114c are coupled to the same initiator 102, due to the higher prioritization of port 114a, determining whether ports 114b and 114c are also coupled to the same initiator 102 may be irrelevant because regardless of whether ports 114b and 114c are coupled to the same initiator 102, control unit 116 may send a port identifier associated with port 114a through port 114c.

In yet another embodiment, ports 114b and 114c may be coupled to the same initiator 102, but may be coupled to a different initiator 102 than port 114a. In such a scenario, after determining that port 114c is not coupled to the same initiator 102 as port 114a and then after determining that port 114c is coupled to the same initiator 102 as port 114b, control unit 116 may send a port identifier associated with port 114b through port 114c to the initiator 102 shared by ports 114b and 114c. Control unit 116 may send the port identifier associated with port 114b through port 114c because port 114b may have a higher priority than port 114c.

Additionally, in embodiments that utilize a delay timer for port 114b, a delay timer may also be associated with port 114c. Like a timer associated with port 114b, upon receipt of an initialization request at port 114c, control unit 116 may start the timer associated with port 114c.

The timer associated with port 114c may be longer than the timer associated with port 114b. Due to the prioritization of port 114c with respect to port 114b, the timer may need to be long enough to allow for configuration of both ports 114a and 114b, and if port 114b has a delay timer also, the delay for port 114c may need to account for that. Similarly to the function and purpose of a delay timer described above with respect to port 114b, once the timer with respect to port 114c expires, if neither ports 114a nor 114b are configured, control unit 116 may configure port 114c and send a port identifier associated with port 114c through port 114c. Accordingly, control unit 116 may avoid indefinitely waiting to configure port 114c if ports 114a and 114b are either not coupled to an initiator 102 or are disabled for some reason.

Returning to FIG. 4, after configuration of port 114c, control unit 116 may configure port 114d. Due to the prioritization, in the present example, control unit 116 may first determine that ports 114d and 114a are not coupled to the same initiator 102, then determine that ports 114d and 114b are not coupled to the same initiator 102, and finally determine that ports 114d and 114c are coupled to the same initiator 102 (e.g. initiator 102b), and that port 114d should operate in wide mode with respect to port 114c.

Upon determining that ports 114d and 114c are coupled to the same initiator 102, control unit 116 may send a port identifier associated with port 114c to initiator 102b through port 114d during configuration of port 114d. Therefore, ports 114c and 114d may logically appear as a single port to initiator 102b. Once again, control unit 116 may send the port identifier associated with port 114c through port 114d because port 114c has a higher priority than port 114d. Due to port 114d being the lowest priority port, in any embodiment where control unit 116 determines that port 114d is coupled to the same initiator 102 as any other port 114, control unit 116 may not send the port identifier associated with port 114d to the shared initiator 102. Accordingly, in the present example, control unit 116 may send the port identifier associated with port 114d only in instances where port 114d is not coupled to the same initiator 102 as any of the other ports of target 104.

In other embodiments, port 114d may be associated with a delay timer similar to those that ports 114c and 114b may be associated with. The timer may be longer than the timer associated with ports 114b and 114c due to the lower prioritization of port 114d, similarly to why the timer associated with port 114c may be longer than the timer associated with port 114b.

Modifications, additions or omissions may be made to system 400 without departing from the scope of the disclosure. Once again, the number of initiators 102 and ports 114 is merely for illustrative purposes and the disclosure should not be limited to such. Additionally, a particular prioritization scheme has been described with respect to ports and port identifiers; however, the present disclosure should not be limited to such. Any system apparatus or device configured to dynamically configure targets according to determinations of shared initiators is contemplated by the present disclosure. For example, the present disclosure describes port identifiers of a particular port being used but other embodiments may utilize a port identifier for a group of ports acting as a single port that is not associated with any of the ports in the group.

Figure 5:
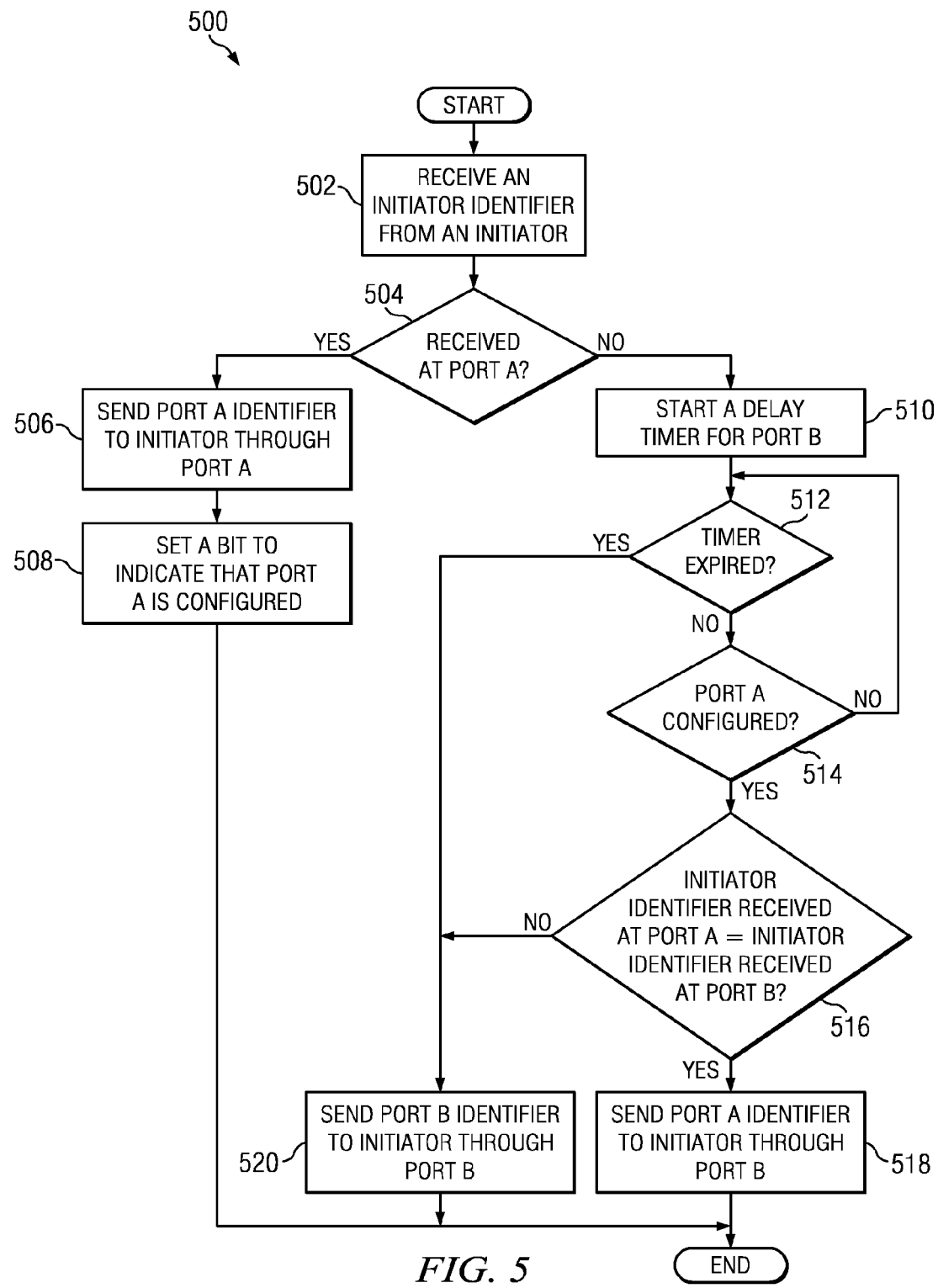
FIG. 5 illustrates an example method for dynamically configuring a SAS target device.

FIG. 5 illustrates an example method 500 for dynamically configuring a SAS target device (e.g., target device 104). Method 500 may start at step 502, where a target device, may receive an initialization request from an initiator. The initialization request may include an initiator identifier. In the present example, the target device may be similar to target 104 depicted in FIG. 1 and may include two ports (ports A and B), similar to ports 110a and 110b. Although the present example is described with respect to a target device having only two ports, the disclosure should not be limited to such. The target device may have more than two ports, such as target 104 depicted with respect to FIG. 4.

At step 504, the target device may determine whether the initiator identifier was received at port A or port B. If the initiator identifier was received at port A, the target device may proceed to step 506. If the initiator identifier was received at port B, the target device may proceed to step 510.

In some instances, the target device may receive an initiator identifier at port A and shortly thereafter receive an initiator identifier at port B or vice versa. Accordingly, although some the following steps may be described in a sequential order, it is understood that the target device may perform the steps of method 500 associated with port A while also simultaneously performing some steps of method 500 associated with port B.

At step 506, the target device may send a port A identifier to the initiator through port A to configure and identify port A. At step 508, the target device may set a bit or flag to indicate that port A has been configured, and method 500 may end.

At step 510, if an initiator identifier is received at port B instead of port A, the target device may start a delay timer for port B. At step 512, the target device may determine whether the timer has expired. If the timer has not expired, method 500 may proceed to step 514, otherwise method 500 may proceed to step 520.

At step 514, the target device may check the bit or flag that indicates whether port A has been configured to determine if port A has been configured. If port A has not been configured, the target device may return to step 512 to determine whether the delay timer has expired. If port A has been configured, the target device may proceed to step 516.

At step 516, the target device may determine whether the initiator identifier received at port A is equal to the initiator identifier received at port B. If the initiator identifiers are equal, the target device may determine that ports A and B are coupled to the same initiator and may proceed to step 518. If the identifiers are not equal, the target device may determine that ports A and B are not coupled to the same initiator and may proceed to step 520.

At step 518, the target device may send the port A identifier through port B to the initiator coupled to both ports A and B. Accordingly, due to the initiator having also received the port A identifier through port A, as described in step 508, the initiator may logically "see" ports A and B as one single port, such that port A and port B operate in wide mode. Following step 518, the method may end.

At step 520, if the initiator identifiers received at ports A and B are not equal, as described in step 516, the target device may send a port B identifier through port B to the initiator that sent the initiator identifier to port B. Accordingly, port B may be configured in narrow mode and may operate as a single port independent from port A. Additionally, as described with respect to step 512, if the timer has expired before port A has been configured, at step 520, the target device may also send a port B identifier through port B to the initiator that sent the initiator identifier to port B. Therefore, in instances where port A is not coupled to an initiator, is disabled, or does not receive or process an initiator request for any reason, port B may still be configured without having to indefinitely wait for port A to be configured, which may never happen. Following step 520, method 500 may end.

Modifications, additions or omissions may be made to method 500 without departing from the scope of the disclosure. For example, some steps may be performed at the same time. Additionally, a target device may have more than two ports. Also, in other embodiments, the timer may be omitted.

Although the present disclosure and its advantages have been described in detail, it should be understood that various changes, substitutions and alterations can be made herein without departing from the spirit and scope of the disclosure as defined by the following claims.

What is claimed is:

1. A method for dynamically configuring a target device, comprising:

receiving a first initiator identifier from one or more initiators at a first port of a target device;

configuring the first port using the first initiator identifier;

detecting whether a second port of the target device has received a second initiator identifier from the one or more initiators before the first port is configured;

determining whether the first initiator identifier and the second initiator identifier were sent by a common initiator when the second port receives the second initiator identifier before the first port is configured; and configuring the first and second ports to operate as a single logical port when the first port received the first initiator identifier and the second port received the second initiator identifier from the common initiator.

2. The method of claim 1, further comprising configuring a third port that has not received an initiator identifier from the common initiator as an independent port separate from each of the first and second ports.

3. The method of claim 2, wherein configuring the third port as the independent port comprises sending a port identifier for the third port to an initiator from which the third port received the initiator identifier.

4. The method of claim 1, wherein determining whether the first initiator identifier and the second initiator identifier were sent by the common initiator comprises determining that the first port received the first initiator identifier and the second port received the second initiator identifier from the common initiator based on the first and second initiator identifiers being the same.

5. The method of claim 1, wherein determining whether the first initiator identifier and the second initiator identifier were sent by the common initiator comprises determining that the first port received the first initiator identifier and the second port received the second initiator identifier from different initiators based on the first and second initiator identifiers being different.

6. The method of claim 1, wherein determining whether the first initiator identifier and the second initiator identifier were sent by the common initiator comprises:

determining that only one of the first and second ports received an initiator identifier; and determining that the first and second ports did not receive the initiator identifier from the common initiator based on only one of the first and second ports receiving the initiator identifier.

7. The method of claim 1, wherein determining whether the first initiator identifier and the second initiator identifier were sent by the common initiator comprises delaying configuration of the second port that received the second initiator identifier until after the first port has been configured.

8. The method of claim 1, wherein configuring the first and second ports to operate as the single logical port comprises sending a single port identifier to the common initiator for both the first and second ports, the single port identifier associated with one of the first and second ports.

9. The method of claim 1, wherein determining whether the first initiator identifier and the second initiator identifier were sent by the common initiator comprises:

initiating a delay timer for the first port that received the first initiator identifier; and detecting whether the second port received the second initiator identifier before expiration of the delay timer.

10. The method of claim 9, wherein determining whether the first initiator identifier and the second initiator identifier were sent by the common initiator further comprises:

comparing the first initiator identifier with the second initiator identifier if the second port received the second initiator identifier before expiration of the timer;

determining that the first initiator identifier and the second initiator identifier were sent by the common initiator if the first initiator identifier and the second initiator identifier are the same; and determining that the first initiator identifier and the second initiator identifier were sent by different initiators if the first initiator identifier and the second initiator identifier are different.

11. The method of claim 9, wherein determining whether the first initiator identifier and the second initiator identifier were sent by the common initiator further comprises determining that the second port will not receive the second initiator identifier if the second port has not received the second initiator identifier upon expiration of the delay timer.

12. An information handling system configured to dynamically configure a target device, comprising:

a first port and a second port communicatively coupled to one or more initiators and configured to receive initiator identifiers from the one or more initiators; and a control unit communicatively coupled to the first and second ports and configured to:

configure the first port using a received first initiator identifier;

detect whether the second port has received a second initiator identifier from the one or more initiators before the first port is configured;

determine whether the first initiator identifier and the second initiator identifier were sent by a common initiator when the second port receives the second initiator identifier before the first port is configured; and configure the first and second ports to operate as a single logical port when the first port received the first initiator identifier and the second port received the second initiator identifier from the common initiator.

13. The information handling system of claim 12, wherein the control unit is further configured to direct each port acting as an independent port to send a port identifier associated with the port to an initiator from which each respective port received an initiator identifier.

14. The information handling system of claim 12, wherein the control unit is further configured to determine that the first port received the first initiator identifier and the second port received the second initiator identifier from the common initiator based on the first and second initiator identifiers being the same.

15. The information handling system of claim 12, wherein the control unit is further configured to:

determine that only one of the first and second ports received an initiator identifier; and determine that the first and second ports did not receive the initiator identifier from the common initiator based on only one of the first and second ports receiving the initiator identifier.

16. The information handling system of claim 12, wherein the control unit is further configured to:

initiate a delay timer for the first port that has received the first initiator identifier; and detect whether the second port received the second initiator identifier before expiration of the delay timer.

17. The information handling system of claim 16, wherein the control unit is further configured to:

compare the first initiator identifier with the second initiator identifier if the second port receives an initiator identifier before expiration of the timer;

determine that the first initiator identifier and the second initiator identifier were sent by the common initiator if the first initiator identifier and the second initiator identifier are the same;

determine that the first initiator identifier and the second initiator identifier were sent by different initiators if the first initiator identifier and the second initiator identifier are different; and determine that the second port will not receive the second initiator identifier if the second port has not received the second initiator identifier upon expiration of the delay timer.

18. An information handling system comprising:

a first and second port communicatively coupled to one or more initiators and configured to receive initiator identifiers from the one or more initiators;

a processor; and a computer-readable medium communicatively coupled to the processor and having one or more instructions stored thereon, the one or more instructions configured to, when executed by the processor:

configure the first port using a received first initiator identifier;

detect whether the second port has received a second initiator identifier from the one or more initiators before the first port is configured;

determine whether the first initiator identifier and the second initiator identifier were sent by a common initiator when the second port receives the second initiator identifier before the first port is configured; and configure the first and second ports to operate as a single logical port when the first port received the first initiator identifier and the second port received the second initiator identifier from the common initiator.

19. The information handling system of claim 18, the one or more instructions further configured to, when executed by the processor, determine that the first port received the first initiator identifier and the second port received the second initiator identifier from the common initiator based on the first and second initiator identifiers being the same.

20. The information handling system of claim 18, the one or more instructions further configured to, when executed by the processor:

determine that only one of the first and second ports received an initiator identifier; and determine that the first and second ports did not receive the initiator identifier from the common initiator based on only one of the first and second ports receiving the initiator identifier.

* * * * *